(12) United States Patent
Neet et al.

(10) Patent No.: US 11,233,436 B2
(45) Date of Patent: Jan. 25, 2022

(54) ELECTRIC MACHINE WITH STATOR HAVING PHASE SHIFT WINDINGS

(71) Applicant: BorgWarner Inc., Auburn Hills, MI (US)

(72) Inventors: Kirk E. Neet, Pendleton, IN (US); Seong Taek Lee, Noblesville, IN (US)

(73) Assignee: BorgWarner Inc., Auburn Hills, MI (US)

( * ) Notice: Subject to any disclaimer, the term of this patent is extended or adjusted under 35 U.S.C. 154(b) by 206 days.

(21) Appl. No.: 16/747,186

(22) Filed: Jan. 20, 2020

(65) Prior Publication Data

US 2020/0153305 A1    May 14, 2020

Related U.S. Application Data

(63) Continuation of application No. 15/652,507, filed on Jul. 18, 2017, now Pat. No. 10,581,292.

(Continued)

(51) Int. Cl.
*H02K 3/12* (2006.01)
*H02K 3/28* (2006.01)
(Continued)

(52) U.S. Cl.
CPC .............. *H02K 3/28* (2013.01); *H02K 1/165* (2013.01); *H02K 3/12* (2013.01); *H02K 3/14* (2013.01); *H02K 3/48* (2013.01)

(58) Field of Classification Search
CPC .. H02K 3/12; H02K 3/14; H02K 3/28; H02K 3/48
See application file for complete search history.

(56) References Cited

U.S. PATENT DOCUMENTS 6,144,136 A    11/2000   Umeda et al.
6,501,204 B1   12/2002   Oohashi et al.
(Continued)

FOREIGN PATENT DOCUMENTS

CN    101478184 A    7/2009
CN    101595623 A    12/2009
(Continued)

OTHER PUBLICATIONS

International Search Report and Written Opinion of the International Searching Authority, PCT/US2017/042698, dated Nov. 1, 2017, 9 pages.

(Continued)

*Primary Examiner* — Ramon M Barrera
(74) *Attorney, Agent, or Firm* — Bose McKinney & Evans LLP (57) ABSTRACT

A multi-phase electric machine having plurality of windings are mounted on the stator core that define a plurality of phases wherein, for each phase, the windings include at least two parallel windings, each winding comprising a pair of continuous wires. For each pole, the parallel windings fill one or more central slots and two outer slots. Each winding fills each central slot twice the number of times that the winding fills each outer slot to thereby define a slot fill ratio of 2:1 between central slots and outer slots and wherein each wire of the wire pair forming a winding fills the slots in a ratio that differs from the slot fill ratio. Each of the parallel windings includes a phase shift end loop that shift the windings from one outer slot to the other outer slot.

20 Claims, 6 Drawing Sheets

Related U.S. Application Data (60) Provisional application No. 62/373,223, filed on Aug. 10, 2016, provisional application No. 62/368,104, filed on Jul. 28, 2016, provisional application No. 62/368,070, filed on Jul. 28, 2016.

(51) Int. Cl.
*H02K 1/16* (2006.01)
*H02K 3/14* (2006.01)
*H02K 3/48* (2006.01)

(56) References Cited

U.S. PATENT DOCUMENTS

| | | |
|---|---|---|
| 6,882,077 B2 | 4/2005 | Neet |
| 6,894,417 B2 | 5/2005 | Cai et al. |
| 7,005,772 B1 | 2/2006 | Frederick et al. |
| 7,034,428 B2 | 4/2006 | Cai et al. |
| 7,269,888 B2 | 9/2007 | Neet |
| 7,365,467 B2 | 4/2008 | Bramson et al. |
| 2003/0214196 A1 | 11/2003 | Cai et al. |
| 2006/0033394 A1 | 2/2006 | Ogawa et al. |
| 2007/0182267 A1 | 8/2007 | Neet |
| 2014/0167547 A1 | 6/2014 | Hao et al. |
| 2015/0054374 A1 | 2/2015 | Neet |
| 2015/0076953 A1 | 3/2015 | Tamura |

FOREIGN PATENT DOCUMENTS

| | | |
|---|---|---|
| CN | 101989773 A | 3/2011 |
| CN | 104426257 A | 3/2015 |
| JP | 2006094694 A | 4/2006 |
| JP | 2012100479 A | 5/2012 |
| JP | 2015023672 A | 2/2015 |
| JP | 2015126630 A | 7/2015 |
| JP | 2015154582 A | 8/2015 |
| KR | 20140016035 A | 2/2014 |
| KR | 10-2015-0123388 | 11/2015 |
| KR | 1020150123388 A | 11/2015 |

OTHER PUBLICATIONS

International Search Report and Written Opinion of the International Searching Authority, PCT/US2017/042704, dated Nov. 1, 2017, 12 pages.

International Search Report and Written Opinion of the International Searching Authority, PCT/US2017/042693, dated Nov. 2, 2017, 14 pages.

ELECTRIC MACHINE WITH STATOR HAVING PHASE SHIFT WINDINGS

CROSS REFERENCE TO RELATED APPLICATIONS

This application is a continuation of U.S. Ser. No. 15/652,507 filed on Jul. 18, 2017 entitled ELECTRIC MACHINE WITH STATOR HAVING PHASE SHIFT WINDINGS which claims priority under 35 U.S.C. 119(e) of U.S. provisional patent application Ser. No. 62/368,070 filed on Jul. 28, 2016 entitled ELECTRIC MACHINE WITH STATOR HAVING PHASE SHIFT WINDINGS; U.S. provisional patent application Ser. No. 62/368,104 filed on Jul. 28, 2016 entitled ELECTRIC MACHINE WITH STATOR HAVING EVEN SLOT DISTRIBUTION; and U.S. provisional patent application Ser. No. 62/373,223 filed on Aug. 10, 2016 entitled ELECTRIC MACHINE WITH STATOR WINDINGS HAVING OVER-UNDER END LOOPS; and is related to U.S. patent application Ser. No. 15/652,388, filed Jul. 18, 2017 entitled ELECTRIC MACHINE WITH STATOR HAVING EVEN SLOT DISTRIBUTION and U.S. patent application Ser. No. 15/652,456, filed Jul. 18, 2017 entitled ELECTRIC MACHINE WITH STATOR WINDINGS HAVING OVER-UNDER END LOOPS; the disclosures of each of which are hereby incorporated herein by reference.

BACKGROUND

The present invention relates to electric machines.

Electric machines are used for several different purposes in modern vehicles. For example, electric machines are commonly employed as starters, alternators, traction motors and for other purposes. In these applications, the electric machine may act as a motor, generator or be selectively operable as either a motor or a generator.

There is an increasing demand for electric machines used in vehicle applications, as well as other non-vehicular applications, for an electric machine with reduced size and increased efficiency.

Improvements in electric machine design which allow for cost efficient manufacture while meeting the increasingly stringent demands of modern vehicular applications are desirable.

SUMMARY

The present invention provides an electric machine having a winding pattern that defines a phase shift and which allows for the cost efficient manufacture of a compact and efficient electric machine.

The invention comprises, in one form thereof, a multi-phase electric machine that includes a stator operably coupled with a rotor wherein the rotor is rotatable relative to the stator. The stator includes a stator core defining a central opening and a plurality of axially extending slots which circumscribe the central opening. A plurality of windings are mounted on the stator core wherein the plurality of windings define a plurality of phases. For each phase, the plurality of windings include at least two parallel windings, each winding includes a pair of continuous wires which fill an equal number of slots. For each pole, the parallel windings fill one or more central slots and two outer slots disposed on opposite sides of the central slots, the number of windings in each phase being equal to one less than the total number of central and outer slots. Each winding fills each of the central slots an equal number of times and fills each of the outer slots an equal number of times and wherein each winding fills each central slot twice the number of times that the winding fills each outer slot to thereby define a slot fill ratio of 2:1 between central slots and outer slots. Each wire of the wire pair fills the slots in a ratio that differs from the slot fill ratio. The parallel windings are disposed in adjacent slots leaving one outer slot empty at each pole for each wrap and each wire extends for a plurality of wraps about the stator. The stator assembly defines a standard pitch between each pole of each phase, the pitch being a common circumferential spacing between corresponding slots of each pole. Each wire includes a phase shift end loop having a pitch that differs from the standard pitch by one slot; each of the parallel windings having the phase shift end loop at the same pole locations whereby the phase shift end loops shift the parallel windings from one of the outer slots to the other outer slot. The stator assembly defines first and second oppositely disposed axial ends, each of the windings defining leads connectable to an external circuit member, the leads being disposed at the first axial end and the phase shift end loops being disposed at the second axial end.

In such an embodiment, the phase shift end loops may be disposed at a location where the wire transitions from one layer to another layer. The phase shift end loops may also each define a pitch one slot greater than the standard pitch.

The windings of each phase may include at least three windings connected in parallel. In such an embodiment having three parallel windings, each pole may include two central slots and two outer slots with each central slot being filled with six segments of wire and each outer slot being filled with three segments of wire. In some embodiments of such an electric machine, the stator assembly may be configured such that, for each pole of each phase a first one of the outer slots is disposed on the counterclockwise side of the central slots and a second one of the outer slots is disposed on the clockwise side of the central slots and wherein the wires disposed in one of the first and second outer slots are disposed in the radially outermost layers and the wires in the other one of the first and second outer slots are disposed in the radially innermost layers whereby each outer slot is filled with wires from two separate phases. In such an embodiment, the stator may be configured such that the individual layers may be either one of the radially innermost layers or one of the radially outermost layers but not both.

Such an embodiment may take the form of a three phase electric machine. It may also include phase shift end loops that are disposed at a location where the wire transitions from one layer to another layer and have phase shift end loops that define a pitch one slot greater than the standard pitch.

In some embodiments, the stator assembly defines first and second oppositely disposed axial ends, each of the windings defining leads being connectable to an external circuit member, the leads being disposed at the first axial end and the phase shift end loops being disposed at the second axial end and with each wire extending for a plurality of wraps about the stator. In such an embodiment, each wire may be a continuous wire that extends for a plurality of wraps about the stator without any breaks in the continuous wire that require a connection. Alternatively, or additionally, in such an embodiment, for each pole, each central slot may be filled with at least six segments of wire and each outer slot may be filled with at least three segments of wire. Alternatively, or additionally, in such an embodiment, the phase shift end loops may be disposed at a location where the wire transitions from one layer to another layer.

The invention comprises, in another form thereof, a multi-phase electric machine that includes a stator operably coupled with a rotor wherein the rotor is rotatable relative to the stator. The stator includes a stator core defining a central opening and a plurality of axially extending slots which circumscribe the central opening. A plurality of windings are mounted on the stator core wherein the plurality of windings define a plurality of phases and wherein, for each phase, the plurality of windings include at least two parallel windings, each winding comprising a pair of continuous wires fill an equal number of slots. For each pole, the parallel windings fill one or more central slots and two outer slots disposed on opposite sides of the central slots. Each winding fills each of the central slots an equal number of times and fills each of the outer slots an equal number of times and wherein each winding fills each central slot twice the number of times that the winding fills each outer slot to thereby define a slot fill ratio of 2:1 between central slots and outer slots and wherein each wire of the wire pair forming a winding fills the slots in a ratio that differs from the slot fill ratio.

In some embodiments, the stator assembly defines a standard pitch between each pole of each phase, the pitch being a common circumferential spacing between corresponding slots of each pole, and wherein each wire includes a phase shift end loop having a pitch that differs from the standard pitch by one slot, each of the parallel windings having the phase shift end loop at the same pole locations. This shifts the parallel windings from one outer slot to the other outer slot.

In such an embodiment, the stator assembly may define first and second oppositely disposed axial ends, each of the windings defining leads connectable to an external circuit member, the leads being disposed at the first axial end and the phase shift end loops being disposed at the second axial end. In still further embodiments, each wire may extend for a plurality of wraps about the stator with the phase shift end loops being disposed at a location where the wire transitions from one layer to another layer.

In some embodiments, the stator assembly defines a winding pattern wherein, for each pole of each phase a first one of the outer slots is disposed on the counterclockwise side of the central slots and a second one of the outer slots is disposed on the clockwise side of the central slots and wherein the wires disposed in one of the first and second outer slots are disposed in the radially outermost layers and the wires in the other one of the first and second outer slots are disposed in the radially innermost layers whereby each outer slot is filled with wires from two separate phases.

In some embodiments, each wire includes at least one position change end loop, wherein each of the parallel windings has one of the position change loops at the same location, wherein the position change end loops define a non-standard pitch to thereby change the relative positions of the parallel windings in the slots. In such an embodiment, the stator assembly may define first and second oppositely disposed axial ends, each of the windings defining leads connectable to an external circuit member, the leads and the position change end loops being disposed at the first axial end and the phase shift end loops being disposed at the second axial end. In some embodiments, each phase of such an electric machine may include at least three windings connected in parallel.

In an embodiment having at least three windings connected in parallel, some embodiments include a stator assembly having three parallel windings for each phase wherein each pole includes two central slots and two outer slots, each central slot being filled with six segments of wire and each outer slot being filled with three segments of wire. In such an embodiment, each wire of each winding of each phase may define one phase shift end loop and three position change end loops with all remaining end loops defining a standard pitch. Such an embodiment may include a stator assembly that defines first and second oppositely disposed axial ends with each of the windings defining leads connectable to an external circuit member, the leads and the position change end loops being disposed at the first axial end and the phase shift end loops being disposed at the second axial end. Such an embodiment may have a stator assembly wherein, for each pole of each phase a first one of the outer slots is disposed on the counterclockwise side of the central slots and a second one of the outer slots is disposed on the clockwise side of the central slots and wherein the wires disposed in one of the first and second outer slots are disposed in the radially outermost layers and the wires in the other one of the first and second outer slots are disposed in the radially innermost layers whereby each outer slot is filled with wires from two separate phases. Such an embodiment may take the form of a three phase electric machine.

The invention comprises, in another form thereof, a multi-phase electric machine including a stator operably coupled with a rotor wherein the rotor is rotatable relative to the stator; the stator including a stator core defining a central opening and a plurality of axially extending slots which circumscribe the central opening; a plurality of windings mounted on the stator core wherein the plurality of windings define a plurality of phases and wherein, for each phase, the plurality of windings include: at least two parallel windings, each winding comprising a pair of continuous wires which are connected in series and fill an equal number of slots; wherein, for each pole, the parallel windings fill at least one central slot and two outer slots disposed on opposite sides of the central slots; each winding filling each of the central slots an equal number of times and filling each of the outer slots an equal number of times and wherein each winding fills each central slot twice the number of times that the winding fills each outer slot to thereby define a slot fill ratio of 2:1 between central slots and outer slots and wherein each wire of the wire pair fills the slots in a ratio that differs from the slot fill ratio; the stator assembly defining a standard pitch between each pole of each phase, the pitch being a common circumferential spacing between corresponding slots of each pole; and wherein each wire includes a phase shift end loop having a pitch that differs from the standard pitch by one slot; each of the parallel windings having the phase shift end loop at the same pole locations whereby the phase shift end loops shift the parallel windings from one of the outer slots to the other outer slot.

In some embodiments, each wire extends for a plurality of wraps about the stator.

In some embodiments, the stator assembly defines first and second oppositely disposed axial ends, each of the windings defining leads connectable to an external circuit member, the leads being disposed at the first axial end and the phase shift loops being disposed at the second axial end.

In some embodiments, the phase shift end loops are disposed at a location where the wire transitions from one layer to another layer.

In some embodiments, the phase shift end loops each define a pitch one slot greater than the standard pitch.

In some embodiments, each phase includes at least three windings connected in parallel. Such an embodiment may be have a structure wherein each phase includes three parallel windings, each central slot being filled with at least six segments of wire and each outer slot being filled with at least three segments of wire. It may also be configured such that each pole includes two central slots and two outer slots. It may also be further configured such that, for each pole of each phase, a first one of the outer slots is disposed on the counterclockwise side of the central slots and a second one of the outer slots is disposed on the clockwise side of the central slots and wherein the wires disposed in one of the first and second outer slots are disposed in radially outermost layers and the wires in the other one of the first and second outer slots are disposed in radially innermost layers whereby each outer slot is filled with wires from two separate phases. Such an electric machine may be a three phase electric machine. It may also be configured such that the phase shift end loops are disposed at a location where the wire transitions from one layer to another layer. Additionally, it may have phase shift end loops which each define a pitch one slot greater than the standard pitch.

In some embodiments, the stator assembly defines first and second oppositely disposed axial ends, each of the windings defining leads connectable to an external circuit member, the leads being disposed at the first axial end and the phase shift end loops being disposed at the second axial end and wherein each wire extends for a plurality of wraps about the stator.

In some embodiments, the stator assembly defines first and second oppositely disposed axial ends, each of the windings defining leads connectable to an external circuit member, the leads being disposed at the first axial end and the phase shift end loops being disposed at the second axial end and wherein each central slot being filled with at least six segments of wire and each outer slot being filled with at least three segments of wire.

In some embodiments, the stator assembly defines first and second oppositely disposed axial ends, each of the windings defining leads connectable to an external circuit member, the leads being disposed at the first axial end and the phase shift end loops being disposed at the second axial end and wherein the phase shift end loops are disposed at a location where the wire transitions from one layer to another layer.

In some embodiments, the stator assembly defines first and second oppositely disposed axial ends, each of the windings defining leads connectable to an external circuit member, the leads being disposed at the first axial end and the phase shift end loops being disposed at the second axial end and wherein each continuous wire extends for a plurality of wraps about the stator without any breaks in the continuous wire that require a connection.

The invention comprises, in another form thereof, a multi-phase electric machine that includes a stator operably coupled with a rotor wherein the rotor is rotatable relative to the stator wherein the stator includes a stator core defining a central opening and a plurality of axially extending slots which circumscribe the central opening. A plurality of windings are mounted on the stator core wherein the plurality of windings define a plurality of phases and wherein, for each phase, the plurality of windings include at least two parallel windings, each winding comprising a pair of continuous wires which are connected in series and fill an equal number of slots; wherein, for each pole, the parallel windings fill at least one central slot and two outer slots disposed on opposite sides of the at least one central slot; the stator assembly defining a standard pitch between each pole of each phase, the pitch being a common circumferential spacing between corresponding slots of each pole; and wherein each wire includes a phase shift end loop having a pitch that differs from the standard pitch by one slot; each of the parallel windings having the phase shift end loop at the same pole locations whereby the phase shift end loops shift the parallel windings from one of the outer slots to the other outer slot wherein the stator assembly defines first and second oppositely disposed axial ends, each of the windings defining leads connectable to an external circuit member, the leads being disposed at the first axial end and the phase shift end loops being disposed at the second axial end.

In some embodiments, each wire extends for a plurality of wraps about the stator.

In some embodiments, for each pole, each central slot is filled with at least six segments of wire and each outer slot is filled with at least three segments of wire.

In some embodiments, the phase shift end loops are disposed at a location where the wire transitions from one layer to another layer.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION

Figure 6:
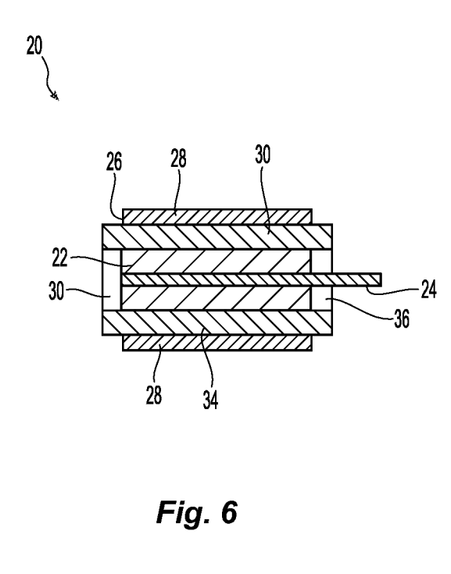
FIG. 6 is a cross sectional view of an electric machine.

FIG. 6 illustrates an electric machine 20. In the illustrated embodiment, electric machine 20 is an automotive alternator capable of operating as a motor or as a generator, however, alternative embodiments may take the form of an electric machine that is solely operable as a motor or solely operable as a generator. Electric machine 20 includes a rotor 22 mounted on a shaft 24 which both rotate relative to stator 26. Stator 26 has a stator core 28 and a plurality of windings 30.

Stator core 28 may be formed out of a stack of laminations and defines a plurality of slots 32. Windings 30 include axially extending segments 34 that are disposed within slots 32 and end turns 36 with each end turn 36 connecting a pair of slot segments 34. Axially extending slots 32 circumscribe central opening 38 of stator core 28.

The illustrated embodiment is a three phase electric machine with six turns. Additionally, each phase includes three windings arranged in parallel. In other words, each winding extends about the full circumference of the stator core six times and there are three such windings for each phase. To achieve this arrangement two separate wires or filars are used for each winding whereby a total of six separate wires or filars are used for each phase. Each of the individual wires form three turns about the stator and is connected in series with another one of the wires to thereby form one of the three windings of each phase.

One parameter that may be used to describe a winding arrangement is slots per pole per phase. This is equal to the number of slots per pole in each slot group of the winding if each such slot were filled solely by windings of one phase. For example, in the illustrated embodiment, there are 18 slot segments in each slot group and each slot holds 6 slot segments therefore the illustrated arrangement has 3 slots per pole per phase. The illustrated embodiment, however, has what is known as a phase shift and some slots hold slot segments of two different phases.

The use such phase shifting can reduce what is known as the skin effect. As a general rule, when the conductors in a particular slot carry different phase currents, the skin effect in such conductors will be less than if all of the conductors in the slot carried the same phase current. While such phase shifting reduces the skin effect, the use of such phase shifting can make it more difficult to electrically balance the windings.

To avoid or minimize a re-circulating current in the winding, it is desirable for the winding to be electrically balanced this is particularly true for a winding having a plurality of wires connected in parallel. Providing an electrically balanced stator can be particularly difficult if phase shifting is employed and each phase is formed by an odd number of windings arranged in parallel.

The illustrated embodiment provides a stator winding pattern which provides an electrically balanced stator with phase shifting and an odd number of windings arranged in parallel for each phase. As mentioned above, the illustrated winding pattern includes six turns and three separate windings for each phase. The pattern has three slots per pole per phase but windings occupy four physical slots for each pole or slot group. In each slot group, the two center slots each have six conductors which are all from the same phase. The two outer slots each have three conductors from one phase and three additional conductors from a different phase. To electrically balance the stator, each slot of the slot group needs to have an equal number of conductors from each of the three windings. It is also desirable for each of the different radial layers to have an equal number of conductors from each of the three windings. This radial balancing, however, is less important than the balancing between slots. The exemplary winding pattern can be used to provide an electrically balanced stator and is further described below with the aid of FIGS. 1-5.

Figure 1:
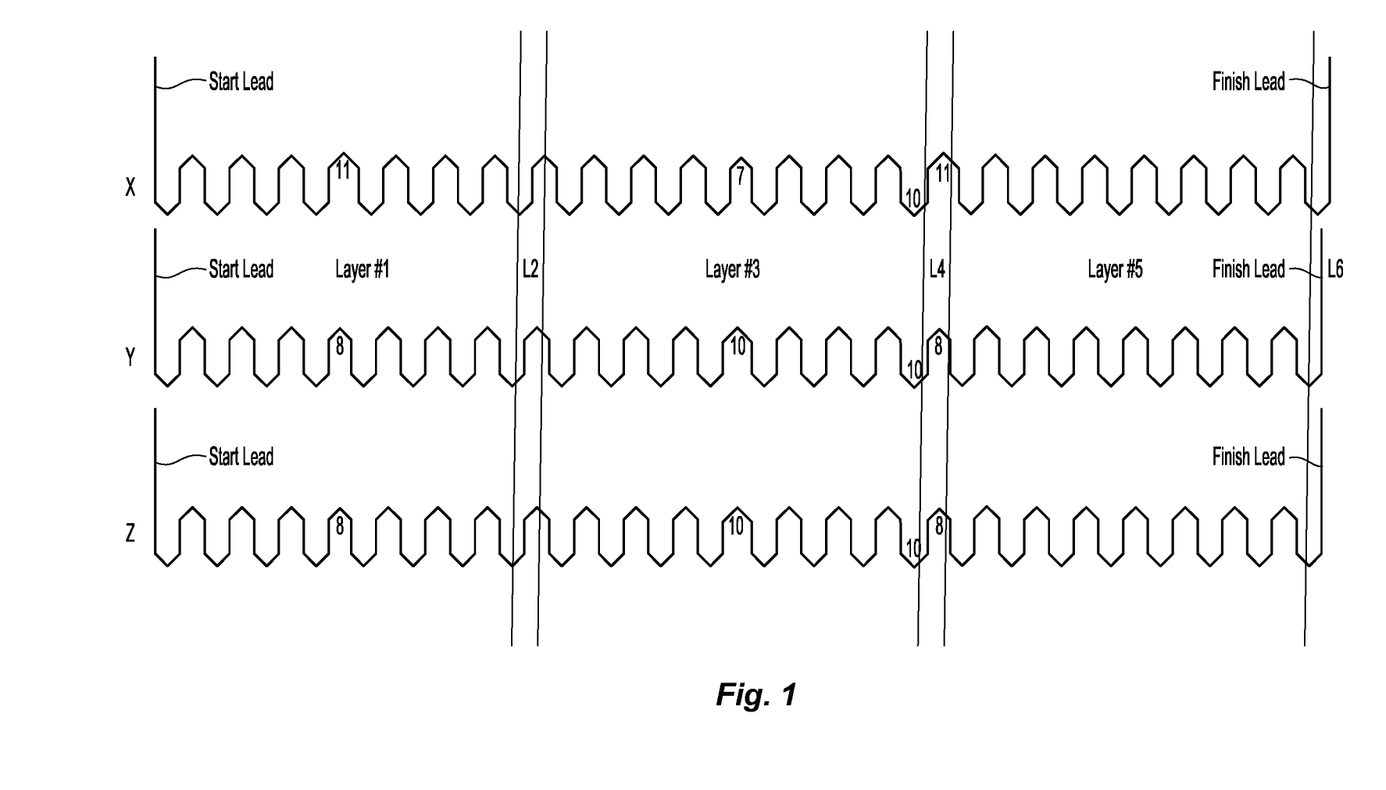
FIG. 1 is a partial winding diagram showing three wires defining a part of an individual phase.
Figure 2:
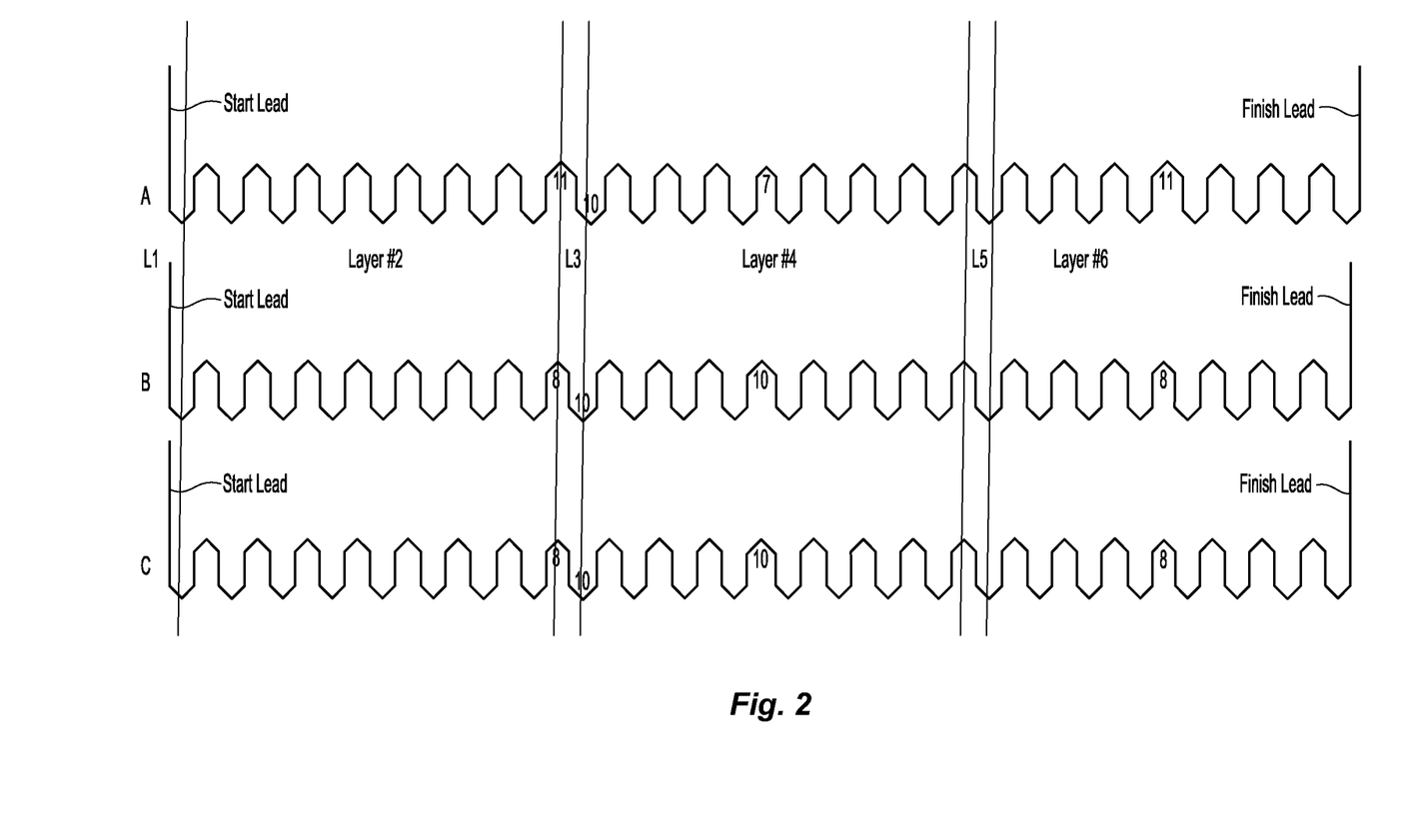
FIG. 2 is a partial winding diagram showing three wires that are connected in series with the wires depicted in FIG. 1 to form an individual phase.

FIG. 1 illustrates three separate wires X, Y, Z that are connected in series with the three separate wires A, B, C illustrated in FIG. 2. More specifically, wire A is connected in series with wire Z to form a first winding, wire B is connected in series with wire X to form a second winding and wire C is connected in series with wire Y to form a third winding. The first, second and third windings are then connected in parallel to form one phase of electric machine 20. Electric machine 20 is a three phase electric machine and two additional phases having the same winding arrangement are also employed with electric machine 20.

Figure 3:
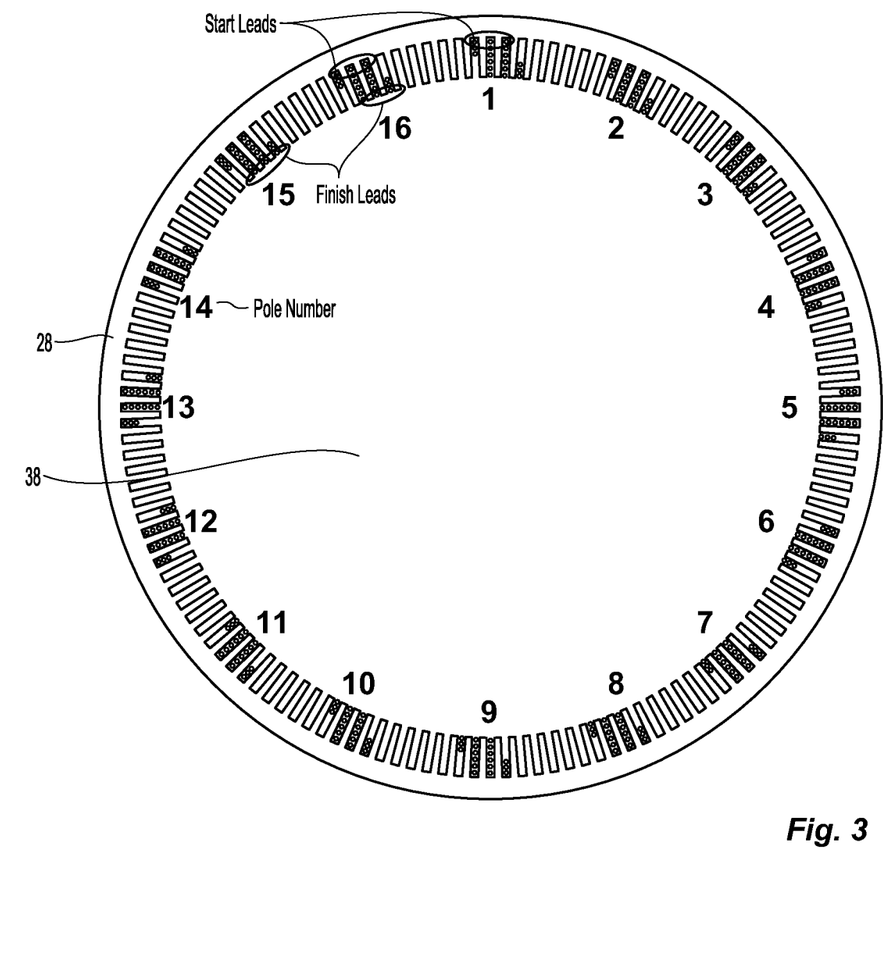
FIG. 3 is a top view of a stator diagram illustrating the arrangement of the wires of FIGS. 1 and 2.

As can be seen in FIG. 3, each phase of the stator assembly defines 16 poles with each pole being formed by four physical slots. Six wires fit within each axially extending stator slot 32. As used herein, the radially outermost wire is in layer 1, layer 2 being the next radially inward wire position and so on with the radially innermost wire position being layer 6.

Figure 4:
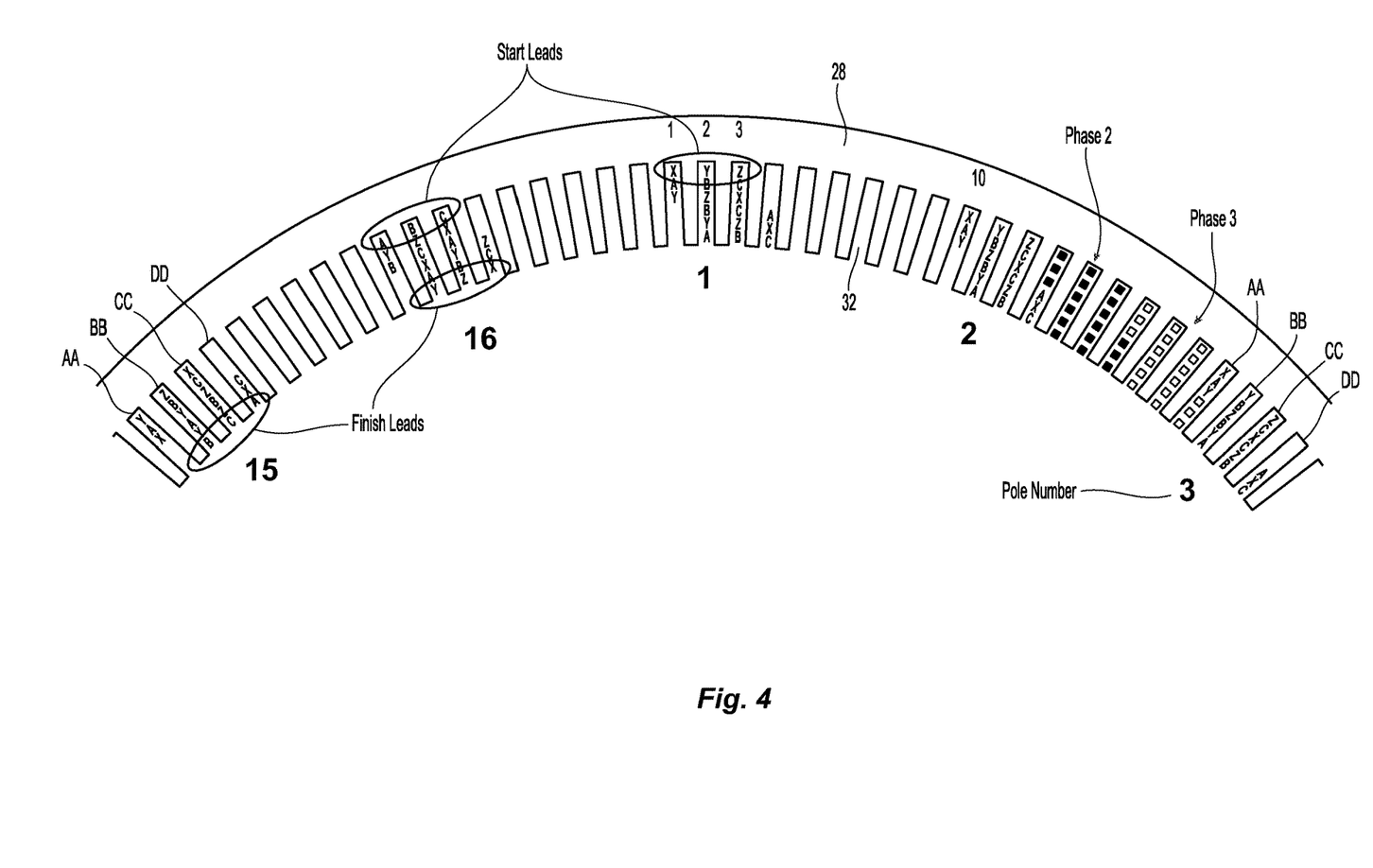
FIG. 4 is a detail view of a portion of the stator diagram of FIG. 3.
Figure 5:
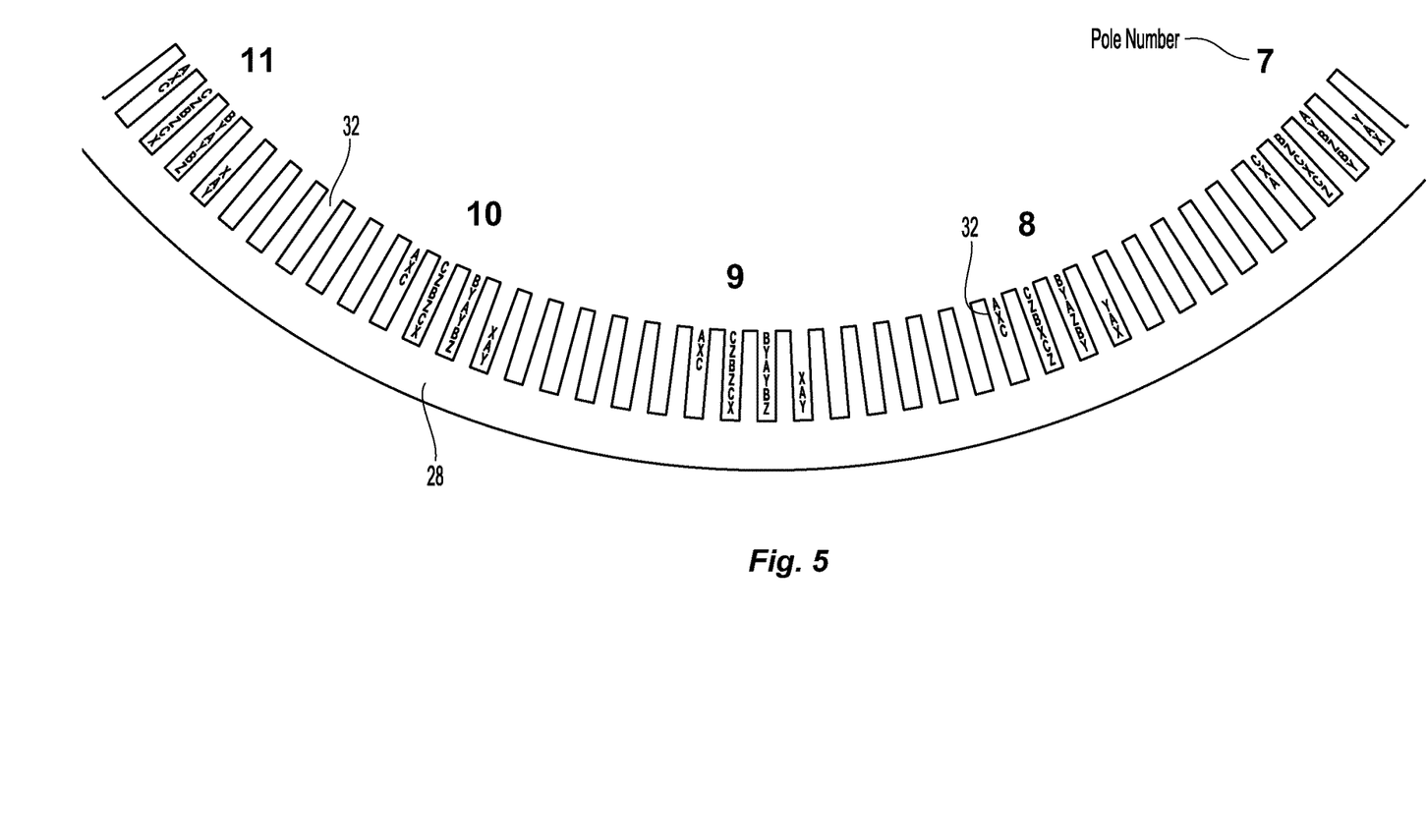
FIG. 5 is another detail view of a portion of the stator diagram of FIG. 3.

As can also be seen in FIG. 3, as well as FIGS. 4 and 5, each of the poles is formed by a group of four slots wherein the two central slots are each completely filled with windings (six windings in the illustrated embodiment) and two outer slots that are only half filled with windings from a particular phase (three windings in the illustrated embodiment) to thereby form a 3-6-6-3 winding pattern. As used herein, and as labelled in FIG. 4 for slot 15 and slot 3, starting at the outer slot on the counterclockwise side of each slot group forming a pole and moving clockwise, the slots are referred to as slot AA, slot BB, slot CC and slot DD. In other words, slots BB and CC form the central slots and slots AA and DD form the outer slots.

The distance between slot AA of one pole and slot AA of the adjacent poles is 9 slots. Similarly, the distance between slot BB of one pole and slot BB of the adjacent poles is 9 slots and so on, this distance between corresponding slots of the slot groups forming adjacent poles defines the standard pitch of the electric machine. In the illustrated embodiment, the standard pitch is 9 slots.

Returning to FIGS. 1 and 2, the wiring diagrams label any pitch between slot segments that is non-standard. The location of the number indicating the non-standard pitch also indicates at which axial end of the stator the end loop forming the non-standard pitch is located. It is also noted that the wiring diagrams of FIGS. 1 and 2 also indicate in which layer position the wires are located.

As most easily seen in FIGS. 3-5, the windings in slot AA are positioned in the radial outermost layers, i.e., layers 1, 2 and 3 while the windings in slot DD are positioned in the radial innermost layers, i.e., layers 4, 5 and 6. When all of the phases have this same pattern, slot AA of one phase will correspond and overlap with slot DD of an adjacent phase allowing the outer slots to be completely filled with windings. FIGS. 3-5 illustrate the windings of only one phase except for the space between poles 2 and 3 of FIG. 4. This portion of FIG. 4 illustrates the location of the windings from a second phase (indicated by filled-in wire outlines) and the location of the windings from a third phase (indicated by the hollow wire outlines). This clearly shows how the outer slots of each phase overlap such that each outer slot includes windings from two different phases.

It is further noted that while the outer slots of the illustrated embodiment have windings wherein the windings from one phase are all positioned in the radially outer most layers and the windings from the other phase are all positioned in the radially innermost layers, other configurations are also possible. For example, the windings from the different phases could alternate. In the illustrated embodiment this could be achieved by having windings in layers 1, 3 and 5 in slot AA and in layers 2, 4 and 6 in slot DD. Such an arrangement, however, would be more difficult to manufacture than the illustrated embodiment and would require a more complex winding pattern.

To control the position of the windings in the outer slots, special end loops referred to herein as phase shift end loops are used. In the illustrated embodiment, each phase includes three windings that are connected in parallel. With each winding being formed by two continuous wires that joined together at their ends to thereby form one long filar that forms one of the parallel windings. The number of parallel windings is one less than the number of physical slots used to form each pole. Thus, for each wrap or turn the windings make about the stator core, the three windings can be used to fill each central slot, BB, CC and one of the outer slots, AA, BB as depicted in the illustrated embodiment. By forming all three windings with a phase shift end loop at a particular spot between two poles wherein the phase shift end loops are all one slot different than the standard pitch end loops, the wires can be shifted from the three most counterclockwise slots of each pole to the three most clockwise slots of each pole or visa versa.

For example, in FIG. 1, at the point where wires X, Y and Z transition from layer 3 to layer 4, all three end loops have a 10 pitch end loop that function as phase shift end loops. In other words, after completing two wraps or turns, the wires X, Y, Z have a phase shift end loop. This is also seen in FIG. 4 wherein at pole 15 in layer 3, wire X is in slot AA, wire Y is in slot BB and wire Z is in slot CC as a result of the 10 pitch phase shift end loops, wire X is in slot BB, wire Y is slot CC and wire Z is in slot DD at pole 16 in layer 4. In the illustrated example, these phase shift end loops occur at the point where the windings transition from layer 3 to layer 4. This is necessary to maintain the pattern wherein the windings are in slot AA in layers 1, 2 and 3 and are in slot DD in layers 4, 5 and 6. If an alternating pattern were employed for the two different phases in the outer slots, a larger number of phase shift end loops would be required.

Wires A, B and C also have phase shift end loops as can be seen with reference to FIGS. 2 and 4. After completing one wrap or turn, wires A, B, C have a phase shift end loop. This can be seen in FIG. 2 where the wires A, B, C transition from layer 3 to layer 4. This is also seen in FIG. 4 wherein at pole 16 in layer 3, wire B is in slot AA, wire C is in slot BB and wire A is in slot CC as a result of the 10 pitch phase shift end loops, wire B is in slot BB, wire C is slot CC and wire A is in slot DD at pole 1 in layer 4.

To provide an electrically balanced winding pattern, each of the parallel windings needs to be in each slot central slot, BB, CC, an equal number of times and needs to be in each outer slot, AA, DD, an equal number of times. For the illustrated embodiment, the fill ratio between the central slots, BB, CC and the outer slots AA, DD is 2:1 and, thus, each winding needs to be disposed in the central slots twice as many times as it is disposed in the outer slots. Position change end loops which shuffle the relative position of the windings in pole slots are used to achieve this balance.

In the illustrated example, each set of wires A, B, C and X, Y, Z are subject to position change end loops to alter the relative position of the wires at three locations for a total of six such locations. Turning first to FIGS. 1, 4 and 5, it can be seen that wires X, Y and Z are subject to three position changes. At the interval between poles 8 and 9 when wires X, Y and Z are in layer 1, a set of position change end loops are used to alter the relative positions of wires X, Y and Z. At this location, the end loop wire X has a pitch of 11 slots while the end loops for wires Y and Z each have a pitch of 8 slots. As a result, wire X moves from slot AA at pole 8 to slot CC at pole 9, wire Y moves from slot BB at pole 8 to slot AA at pole 9 and wire Z moves from slot CC at pole 8 to slot BB at pole 9.

Wires X, Y, Z are subject to another position change at the interval between pole 8 and 9 when the wires are in layer 3. See FIGS. 1 and 5. This position change involves wire X having a position change end loop with a pitch of 7 slots, wire Y having a position change end loop with a pitch of 10 slots and wire Z having a position change end loop with a pitch of 10 slots. As a result, in layer 3, wire X moves from slot CC at pole 8 to slot AA at pole 9, wire Y moves from slot AA at pole 8 to slot BB at pole 9 and wire Z moves from slot BB at pole 8 to slot CC at pole 9.

Wires X, Y, Z are subject to a third position change at the interval between poles 16 and 1 as the wires shift from layer 4 to layer 5. See FIGS. 1 and 4. This position change involves wire X having a position change end loop with a pitch of 11 slots, wire Y having a position change end loop with a pitch of 8 slots and wire Z having a position change end loop with a pitch of 8 slots. Each of these position change end loops also move wires X, Y, Z from layer 4 at pole 16 to layer 5 at pole 1. Thus, wire X moves from slot BB at pole 16 to slot DD at pole 1, wire Y moves from slot CC at pole 16 to slot BB at pole 1 and wire Z moves from slot DD at pole 16 to slot CC at pole 1. To provide an electrically balanced winding pattern, each of the parallel windings needs to be in each central slot BB an equal number of times, in each central slot CC an equal number of times, in each outer slot AA an equal number of times and in each outer slot DD an equal number of times. For a stator having more slots per pole per phase, the same pattern applies for the parallel wires to be electrically balanced.

Wires A, B, C are also subject to position change end loops. More specifically, and as can be seen in FIGS. 2 and 3, at the point where wires A, B, C shift from layer 2 to layer 3, the end loops extending between poles 15 and 16 are position change end loops. This position change involves wire A having a position change end loop with a pitch of 11 slots, wire B having a position change end loop with a pitch of 8 slots and wire C having a position change end loop with a pitch of 8 slots. Each of these position change end loops also move wires A, B, C from layer 2 at pole 15 to layer 3 at pole 16. Thus, wire A moves from slot AA at pole 15 to slot CC at pole 16, wire B moves from slot BB at pole 15 to slot AA at pole 16 and wire C moves from slot CC at pole 15 to slot BB at pole 16.

Wires A, B, C are subject to a second position change at the interval between poles 7 and 8 in layer 4. This position change involves wire A having a position change end loop with a pitch of 7 slots, wire B having a position change end loop with a pitch of 10 slots and wire C having a position change end loop with a pitch of 10 slots. Thus, wire A moves from slot DD at pole 7 to slot BB at pole 8, wire B moves from slot BB at pole 7 to slot CC at pole 8 and wire C moves from slot CC at pole 7 to slot DD at pole 8.

Wires A, B, C are subject to a third position change at the interval between poles 7 and 8 in layer 6. This position change involves wire A having a position change end loop with a pitch of 11 slots, wire B having a position change end loop with a pitch of 8 slots and wire C having a position change end loop with a pitch of 8 slots. Thus, wire A moves from slot BB at pole 7 to slot DD at pole 8, wire B moves from slot CC at pole 7 to slot BB at pole 8 and wire C moves from slot DD at pole 7 to slot CC at pole 8.

As mentioned above, the wiring diagrams in FIGS. 1 and 2 label any pitch between slot segments that is non-standard. The location of the number indicating the non-standard pitch also indicates at which axial end of the stator the end loop forming the non-standard pitch is located. FIGS. 1 and 2 also show from which axial end of the stator the beginning and end of wires A, B, C, X, Y, Z extend. As can be seen in FIG. 1, the position change end loops for wires X, Y, Z are all at the same axial end of the stator assembly as the start and finish lead ends of wires X, Y, Z with the phase shift end loops being positioned on the opposite axial end of the stator assembly. Similarly, as can be seen in FIG. 2, the position change end loops for wires A, B, C are all at the same axial end of the stator assembly as the start and finish lead ends of wires A, B, C with the phase shift end loops being positioned on the opposite axial end of the stator assembly.

The start and finish lead ends and position change end loops of wires A, B, C, X, Y, Z are all on the same axial end of the stator assembly while the phase change end loops of wires A, B, C, X, Y, Z are all on the opposite side of the stator assembly.

It is additionally noted that when position change end loops are used with the wires, the individual wire having the largest pitch will be extended further axially than the wires with the shorter pitches and will have an end loop that extends over the shorter pitch and axially shorter end loops. In other words, if three wires have position change end loops with two wires having a pitch of 8 and one having a pitch of 11, the wire having a pitch of 11 will be extended axially further from the stator core than the two wires with the pitch of 8 and the end loop of the wire having a pitch of 11 will extend over the other two wires having a pitch of 8 to thereby avoid spatial conflicts between the wires.

While the described position change end loops are used to electrically balance the windings, it is noted that the wires A, B, C, X, Y, Z are not individually electrically balanced but once they are serially connected in pairs, the three resulting parallel windings are electrically balanced. In other words, each winding is formed by a series connection between two individual unbalanced wires to form a balanced winding. This is further discussed below with reference to Tables 3 and 4.

The wires are connected together at their finish ends. Thus, the end of wire A extending from layer 6 at pole 15 is connected in series with the end of wire Z extending from layer 6 at pole 16; the end of wire B extending from layer 6 at pole 15 is connected in series with the end of wire X extending from layer 6 at pole 16; and the end of wire C extending from layer 6 at pole 15 is connected in series with the end of wire Y extending from layer 6 at pole 16. The start leads of each of the wires are connected with an external circuit member. For example, start leads A, B and C may all be attached to a neutral connection with start leads X, Y and Z all being attached to a regulator, inverter or other circuit member. The start leads of the A, B and C wires all extend from layer 1 of pole 16 and are conductively coupled together, similarly, the start leads of the X, Y and Z wires all extend from layer 1 of pole 1 and are conductively coupled together. As a result the first winding (formed by the series connected pair of wires A and Z), the second winding (formed by the series connected pair of wires B and X), and the third winding (formed by the series connected pair of wires C and Y) are arranged in parallel. It is further noted that in the illustrated embodiment, each of the series connections, i.e., between A and Z, between B and X and between C and Y, is also a reversing connection with one of the wires extending in a clockwise direction about the stator from the series connection and the other wire extending in a counterclockwise direction about the stator from the series connection.

As can be understood with reference to the tables presented below, the winding pattern described above and shown in figures provides an electrically balanced stator assembly.

Table 1 presented below provides a detailed summary of the winding pattern for wires A, B, C of the winding pattern for wires X, Y, Z of a single phase of three phase electric machine 20.

TABLE 1

Winding Pattern for Wires A, B, C

|  | Turn | Layer | Slot Group | Slot AA | Slot BB | Slot CC | Slot DD |
|---|---|---|---|---|---|---|---|
| Start | 1 | 1 | 16 | A | B | C |  |
| Layer Change | 1 | 2 | 1 | A | B | C |  |
|  | 1 | 2 | 2 | A | B | C |  |
|  | 1 | 2 | 3 | A | B | C |  |
|  | 1 | 2 | 4 | A | B | C |  |
|  | 1 | 2 | 5 | A | B | C |  |
|  | 1 | 2 | 6 | A | B | C |  |
|  | 1 | 2 | 7 | A | B | C |  |
|  | 1 | 2 | 8 | A | B | C |  |
|  | 1 | 2 | 9 | A | B | C |  |
|  | 1 | 2 | 10 | A | B | C |  |
|  | 1 | 2 | 11 | A | B | C |  |
|  | 1 | 2 | 12 | A | B | C |  |
|  | 1 | 2 | 13 | A | B | C |  |
|  | 1 | 2 | 14 | A | B | C |  |
|  | 1 | 2 | 15 | A | B | C |  |
| Layer and Position Change | 2 | 3 | 16 | B | C | A |  |
| Slot Shift and Layer Change | 2 | 4 | 1 |  | B | C | A |
|  | 2 | 4 | 2 |  | B | C | A |
|  | 2 | 4 | 3 |  | B | C | A |
|  | 2 | 4 | 4 |  | B | C | A |
|  | 2 | 4 | 5 |  | B | C | A |
|  | 2 | 4 | 6 |  | B | C | A |
|  | 2 | 4 | 7 |  | B | C | A |
| Position Change | 2 | 4 | 8 | A | B | C |  |
|  | 2 | 4 | 9 | A | B | C |  |
|  | 2 | 4 | 10 | A | B | C |  |
|  | 2 | 4 | 11 | A | B | C |  |
|  | 2 | 4 | 12 | A | B | C |  |
|  | 2 | 4 | 13 | A | B | C |  |
|  | 2 | 4 | 14 | A | B | C |  |
|  | 2 | 4 | 15 | A | B | C |  |
| Layer Change | 3 | 5 | 16 | A | B | C |  |
| Layer Change | 3 | 6 | 1 | A | B | C |  |
|  | 3 | 6 | 2 | A | B | C |  |
|  | 3 | 6 | 3 | A | B | C |  |
|  | 3 | 6 | 4 | A | B | C |  |
|  | 3 | 6 | 5 | A | B | C |  |
|  | 3 | 6 | 6 | A | B | C |  |
|  | 3 | 6 | 7 | A | B | C |  |
| Position Change | 3 | 6 | 8 | B | C | A |  |
|  | 3 | 6 | 9 | B | C | A |  |
|  | 3 | 6 | 10 | B | C | A |  |
|  | 3 | 6 | 11 | B | C | A |  |
|  | 3 | 6 | 12 | B | C | A |  |
|  | 3 | 6 | 13 | B | C | A |  |
|  | 3 | 6 | 14 | B | C | A |  |
| Finish | 3 | 6 | 15 | B | C | A |  |

Table 2 presented below provides a detailed summary of the winding pattern for wires X, Y, Z of a single phase of three phase electric machine 20.

TABLE 2

Winding Pattern for Wires X, Y, Z.

|  | Turn | Layer | Slot Group | Slot AA | Slot BB | Slot CC | Slot DD |
|---|---|---|---|---|---|---|---|
| Start | 1 | 1 | 1 | X | Y | Z |  |
|  | 1 | 1 | 2 | X | Y | Z |  |
|  | 1 | 1 | 3 | X | Y | Z |  |
|  | 1 | 1 | 4 | X | Y | Z |  |
|  | 1 | 1 | 5 | X | Y | Z |  |
|  | 1 | 1 | 6 | X | Y | Z |  |
|  | 1 | 1 | 7 | X | Y | Z |  |
|  | 1 | 1 | 8 | X | Y | Z |  |
| Position Change | 1 | 1 | 9 | Y | Z | X |  |
|  | 1 | 1 | 10 | Y | Z | X |  |
|  | 1 | 1 | 11 | Y | Z | X |  |

TABLE 2-continued

Winding Pattern for Wires X, Y, Z.

|  | Turn | Layer | Slot Group | Slot AA | Slot BB | Slot CC | Slot DD |
|---|---|---|---|---|---|---|---|
|  | 1 | 1 | 12 | Y | Z | X |  |
|  | 1 | 1 | 13 | Y | Z | X |  |
|  | 1 | 1 | 14 | Y | Z | X |  |
|  | 1 | 1 | 15 | Y | Z | X |  |
| Layer Change | 1 | 2 | 16 | Y | Z | X |  |
| Layer Change | 2 | 3 | 1 | Y | Z | X |  |
|  | 2 | 3 | 2 | Y | Z | X |  |
|  | 2 | 3 | 3 | Y | Z | X |  |
|  | 2 | 3 | 4 | Y | Z | X |  |
|  | 2 | 3 | 5 | Y | Z | X |  |
|  | 2 | 3 | 6 | Y | Z | X |  |
|  | 2 | 3 | 7 | Y | Z | X |  |
|  | 2 | 3 | 8 | Y | Z | X |  |
| Position Change | 2 | 3 | 9 | X | Y | Z |  |
|  | 2 | 3 | 10 | X | Y | Z |  |
|  | 2 | 3 | 11 | X | Y | Z |  |
|  | 2 | 3 | 12 | X | Y | Z |  |
|  | 2 | 3 | 13 | X | Y | Z |  |
|  | 2 | 3 | 14 | X | Y | Z |  |
|  | 2 | 3 | 15 | X | Y | Z |  |
| Slot Shift and Layer Change | 2 | 4 | 16 |  | X | Y | Z |
| Layer Change and Position Change | 3 | 5 | 1 | Y | Z | X |  |
|  | 3 | 5 | 2 | Y | Z | X |  |
|  | 3 | 5 | 3 | Y | Z | X |  |
|  | 3 | 5 | 4 | Y | Z | X |  |
|  | 3 | 5 | 5 | Y | Z | X |  |
|  | 3 | 5 | 6 | Y | Z | X |  |
|  | 3 | 5 | 7 | Y | Z | X |  |
|  | 3 | 5 | 8 | Y | Z | X |  |
|  | 3 | 5 | 9 | Y | Z | X |  |
|  | 3 | 5 | 10 | Y | Z | X |  |
|  | 3 | 5 | 11 | Y | Z | X |  |
|  | 3 | 5 | 12 | Y | Z | X |  |
|  | 3 | 5 | 13 | Y | Z | X |  |
|  | 3 | 5 | 14 | Y | Z | X |  |
|  | 3 | 5 | 15 | Y | Z | X |  |
| Layer Change and Finish | 3 | 6 | 16 | Y | Z | X |  |

Table 3 provides a summary of the slot locations for each of wires A, B, C, X, Y, Z of a single phase of three phase electric machine 20 and illustrates how each of these individual wire are unbalanced.

TABLE 3

Slot Totals by Wire

|  | Slot AA | Slot BB | Slot CC | Slot DD |
|---|---|---|---|---|
| Total for A | 16 | 16 | 1 | 15 |
| Total for B | 1 | 31 | 16 | 0 |
| Total for C | 0 | 1 | 31 | 16 |
| Total for X | 15 | 1 | 16 | 16 |
| Total for Y | 16 | 31 | 1 | 0 |
| Total for Z | 0 | 16 | 31 | 1 |

Table 4 provides a summary of the slot locations for each of the parallel windings which are formed by a series connection between a pair of the individual wires for a single phase of three phase electric machine 20. More specifically by joining wires A and Z into a single elongate filar, by joining wires B and X into a single elongate filar and by joining wires C and Y into a single elongate filar. Table 4 also demonstrates that the three resulting windings are electrically balanced.

TABLE 4

Slot Totals by Winding

|  | Slot AA | Slot BB | Slot CC | Slot DD |
|---|---|---|---|---|
| A and Z | 16 + 0 | 16 + 16 | 1 + 31 | 15 + 1 |
| B and X | 1 + 15 | 31 + 1 | 16 + 16 | 0 + 16 |
| C and Y | 0 + 16 | 1 + 31 | 31 + 1 | 16 + 0 |

As can be seen from Table 4, the central to outer slot ratio for the windings is 2:1 but, as can be understood with reference to Table 3, the ratio between central slot and outer slot for the individual wires A, B, C, X, Y, Z are not 2:1. Table 4 shows how each individual unbalanced wire can be connected in series with another individual unbalanced wire to form a balanced winding.

While this invention has been described as having an exemplary design, the present invention may be further modified within the spirit and scope of this disclosure. This application is therefore intended to cover any variations, uses, or adaptations of the invention using its general principles.

What is claimed is:

1. A multi-phase electric machine comprising:
a stator operably coupled with a rotor wherein the rotor is rotatable relative to the stator;
the stator including a stator core defining a central opening and a plurality of axially extending slots which circumscribe the central opening;
a plurality of windings mounted on the stator core wherein the plurality of windings define a plurality of phases and wherein, for each phase, the plurality of windings include:
at least two parallel windings, each winding comprising a pair of continuous wires which are disposed in an equal number of slots; wherein, for each pole, the parallel windings are disposed in at least one central slot and two outer slots disposed on opposite sides of the central slots whereby each pole has a first one of the outer slots disposed on the counterclockwise side of the at least one central slot and a second one of the outer slots disposed on the clockwise side of the at least one central slot; each winding disposed in each of the central slots an equal number of times and disposed in each of the outer slots an equal number of times and wherein each winding is disposed in each central slot twice the number of times that the winding is disposed in each outer slot to thereby define a slot fill ratio of 2:1 between central slots and outer slots and wherein each wire of the wire pair is disposed in the slots in a ratio that differs from the slot fill ratio;
the stator assembly defining a standard pitch between each pole of each phase, the pitch being a common circumferential spacing between corresponding slots of each pole;
and wherein each wire includes a phase shift end loop having the same non-standard pitch that differs from the standard pitch by one slot; each of the parallel windings having the phase shift end loop between first and second poles, whereby the phase shift end loops extend from one of the first and second outer slots and the at least one central slot of the first pole to the other one of the first and second outer slots and the at least one central slot in the second pole.

2. The electric machine of claim 1 wherein each wire extends for a plurality of wraps about the stator.

3. The electric machine of claim 1 wherein the stator assembly defines first and second oppositely disposed axial ends, each of the windings defining leads connectable to an external circuit member, the leads being disposed at the first axial end and the phase shift loops being disposed at the second axial end.

4. The electric machine of claim 1 wherein the phase shift end loops are disposed at a location where the wire transitions from one layer to another layer.

5. The electric machine of claim 1 wherein, the phase shift end loops each define a pitch one slot greater than the standard pitch.

6. The electric machine of claim 1 wherein each phase includes at least three windings connected in parallel.

7. The electric machine of claim 6 wherein each phase includes three parallel windings, each central slot being filled with at least six segments of wire and each outer slot being filled with at least three segments of wire.

8. The electric machine of claim 7 wherein each pole includes two central slots and two outer slots.

9. The electric machine of claim 8 wherein, for each pole of each phase, the wires disposed in one of the first and second outer slots are disposed in radially outermost layers and the wires in the other one of the first and second outer slots are disposed in radially innermost layers whereby each outer slot is filled with wires from two separate phases.

10. The electric machine of claim 9 wherein the electric machine is a three phase electric machine.

11. The electric machine of claim 10 wherein the phase shift end loops are disposed at a location where the wire transitions from one layer to another layer.

12. The electric machine of claim 11 wherein, the phase shift end loops each define a pitch one slot greater than the standard pitch.

13. The electric machine of claim 1 wherein the stator assembly defines first and second oppositely disposed axial ends, each of the windings defining leads connectable to an external circuit member, the leads being disposed at the first axial end and the phase shift end loops being disposed at the second axial end and wherein each wire extends for a plurality of wraps about the stator.

14. The electric machine of claim 13 wherein each wire is a continuous wire that extends for a plurality of wraps about the stator without any breaks in the continuous wire that require a connection.

15. The electric machine of claim 14 wherein, for each pole, each central slot is filled with at least six segments of wire and each outer slot is filled with at least three segments of wire.

16. The electric machine of claim 15 wherein the phase shift end loops are disposed at a location where the wire transitions from one layer to another layer.

17. A multi-phase electric machine comprising:
a stator operably coupled with a rotor wherein the rotor is rotatable relative to the stator;
the stator including a stator core defining a central opening and a plurality of axially extending slots which circumscribe the central opening;
a plurality of windings mounted on the stator core wherein the plurality of windings define a plurality of phases and wherein, for each phase, the plurality of windings include:
at least two parallel windings, each winding comprising a pair of continuous wires which are disposed in an equal number of slots; wherein, for each pole, the parallel windings are disposed in at least one central slot and two outer slots disposed on opposite sides of the at least one central slot whereby each pole has a first one of the outer slots disposed on the counterclockwise side of the at least one central slot and a second one of the outer slots disposed on the clockwise side of the at least one central slot;
the stator assembly defining a standard pitch between each pole of each phase, the pitch being a common circumferential spacing between corresponding slots of each pole;
and wherein each wire includes a phase shift end loop having the same non-standard pitch that differs from the standard pitch by one slot; each of the parallel windings having the phase shift end loop between first and second poles, whereby the phase shift end loops extend from one of the first and second outer slots and the at least one central slot of the first pole to the other one of the first and second outer slots and the at least one central slot in the second pole, and wherein the stator assembly defines first and second oppositely disposed axial ends, each of the windings defining leads connectable to an external circuit member, the leads being disposed at the first axial end and the phase shift end loops being disposed at the second axial end.

18. The electric machine of claim 17 wherein each wire extends for a plurality of wraps about the stator.

19. The electric machine of claim 17 wherein, for each pole, each central slot is filled with at least six segments of wire and each outer slot is filled with at least three segments of wire.

20. The electric machine of claim 17 wherein the phase shift end loops are disposed at a location where the wire transitions from one layer to another layer.

* * * * *